DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 1, 1974

918 O.G. 103

T918,003

ANTIOXIDANT COMPOSITIONS

Ernest R. Sherwin, 4044 Skyland Drive 37664; Bobby M. Luckadoo, 504 Robindale Lane 37663; and Emma J. Freeman, 1849 Fairoaks Road 37663, all of Kingsport, Tenn.

Continuation-in-part of application Ser. No. 153,838, June 16, 1971. This application Apr. 2, 1973, Ser. No. 347,002

Claims priority; application Argentina, Apr. 11, 1972, 241,401; Canada, May 9, 1972, 141,666; Venezuela, May 26, 1972, 2,675; Mexico, June 14, 1972, 136,283; Australia, June 15, 1972, 43,436; Brazil, June 15, 1972, 3,875; Japan, June 15, 1972, 47/59,100; Great Britain, June 15, 1972, 28,015/72

Int. Cl. A23d *5/04;* A23l *3/34*

U.S. Cl. 426—181

No Drawing. 24 Pages Specification

An antioxidant composition for oils and fats particularly those used for frying is retained in the oil or fat even after many fryings at high temperatures. Included in the composition are (A) about 60 to 99% by weight of the composition of an antioxidant selected from the group consisting of mono-tertiary-butylhydroquinone, a gallic acid ester selected from propyl, octyl or dodecyl gallates; and blends of these antixodiants with butylated hydroxyanisole and butylated hydroxytoluene;

(B) 0 to 34% by weight of the composition of an organic acid synergist selected from the group consisting of citric acid, ascorbic acid, tartaric acid, fumaric acid, and esters thereof, ethylene-diaminetetraacetic acid and its sodium and calcium salts; and (C) about 0.1 to 5% by weight of the composition of a compound from the class consisting of polydimethyl and polydiethyl siloxane having a viscosity of 100 to 100,000 centistokes at 100° F.